July 5, 1927.
J. B. SMALL ET AL
1,634,802
DRAWING SHEET GLASS
Filed May 9, 1924
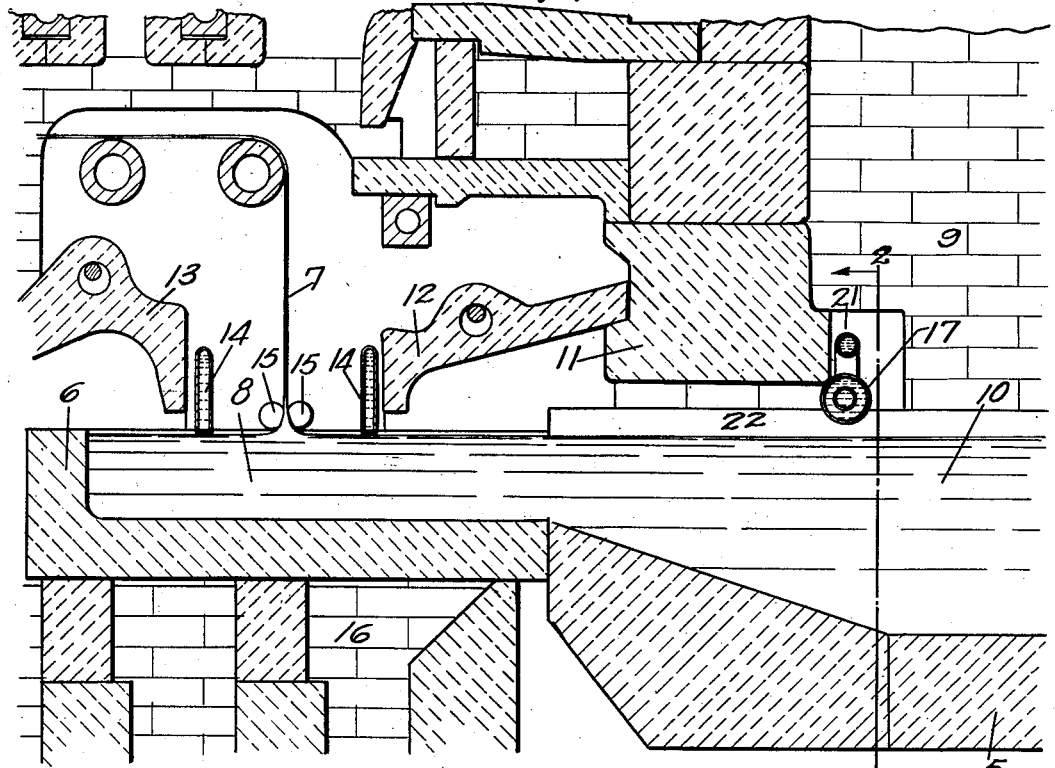
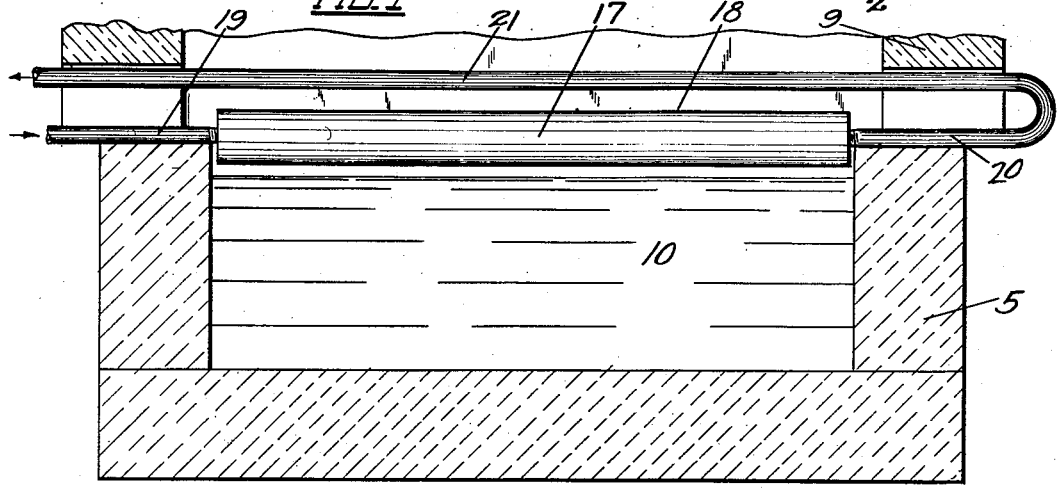
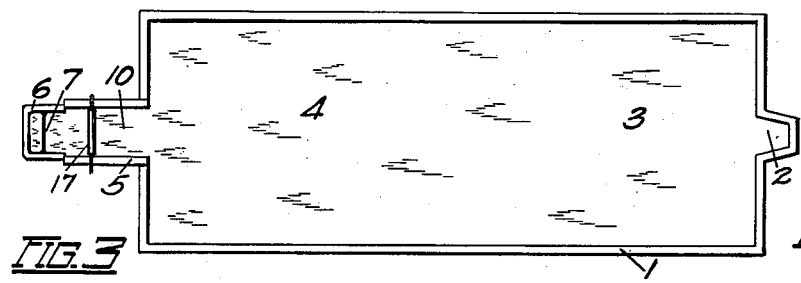
INVENTORS
James B. Small &
Frank J. Kincaid
BY C. A. Rowley
ATTORNEY Patented July 5, 1927.

1,634,802

UNITED STATES PATENT OFFICE.

JAMES B. SMALL AND FRANK J. KINCAID, OF CHARLESTON, WEST VIRGINIA, ASSIGNORS TO THE LIBBEY-OWENS SHEET GLASS COMPANY, OF TOLEDO, OHIO, A CORPORATION OF OHIO.

DRAWING SHEET GLASS.

Application filed May 9, 1924. Serial No. 711,975.

This invention relates to the art of drawing sheet glass, and more particularly to an improved process and apparatus for more rapidly conditioning the molten glass for the sheet drawing operation, and thus permitting an increased drawing rate, and hence increased production.

In the system of drawing sheet glass substantially set forth in the Colburn Patent, 1,248,809, granted December 4, 1917, a mass of molten glass is continuously produced in a tank furnace from which it flows into a shallow receptacle or draw-pot. A continuous sheet of glass is drawn upwardly from the surface of the molten glass in the drawpot, then bent while still somewhat plastic about a cooled bending roller and carried away horizontally through an annealing leer. The surface glass adjacent the sheet source is exposed to the cooling influence of the air, and heat-absorbing shields are placed closely adjacent the surface glass at each side of the sheet source to protect the sheet from heated gases from the furnace, and also to absorb heat from the surface glass flowing thereunder into the sheet source. By this means the molten glass is rapidly chilled just prior to being drawn into sheet form, to reduce it to the proper drawing temperature.

According to the present invention an additional cooler or heat-absorbing body is positioned closely adjacent the surface of that portion of the molten glass which is flowing from the glass-producing tank into the receptacle from which the sheet is drawn. This additional cooling body functions to protect the surface glass in the draw-pot from the direct action of heated gases from the furnace, and also by rapidly absorbing heat from the surface strata of the flowing glass prior to its entrance to the draw-pot expedites the conditioning of the glass in the pot and permits a more rapid withdrawal of glass therefrom in sheet form.

The objects and advantages of the invention will be more clearly understood from the following detailed description of one approved form of the apparatus.

In the accompanying drawings:

Fig. 1 is a longitudinal vertical section through those portions of the sheet-producing mechanism directly concerned with the present invention.

Fig. 2 is a transverse vertical section taken substantially on the line 2—2 of Fig. 1.

Fig. 3 is a diagrammatic plan, on a smaller scale, of the above apparatus in connection with the glass-producing furnace.

The glass-producing materials are inserted into the furnace 1 through doghouse 2, reduced in the melting end 3 of the furnace to molten glass, this molten glass then flowing through the refining end 4 of the furnace into the smaller and shallower so-called cooling tank 5. From the cooling-tank 5 the glass flows into the shallow receptacle or draw-pot 6, the glass sheet 7 being continuously drawn upward from the surface of the molten glass 8 in receptacle 6. The usual furnace chamber encloses the molten glass in the melting and refining tanks 3 and 4, and a so-called cooling chamber 9 encloses the molten glass 10 in cooling tank 5. From the cooling tank the glass 10 flows under the jack-arch 11 into receptacle 6, and all of the surface glass in receptacle 6, except the comparatively narrow transverse strip from which sheet 7 is drawn upwardly, is enclosed by the cover-tiles 12 and 13. At each side of sheet 7 a hollow metallic water-cooled shield 14 is placed with its lower edge closely adjacent to the surface of the molten pool 8. These shields or coolers 14 serve to protect the sheet source from heated gases flowing out under the lip-tiles 12 and 13 and at the same time rapidly absorb heat from the surface glass which passes under the lower edges of the coolers, thus reducing this glass to the proper temperature to be drawn into sheet form.

At 15 are indicated a pair of small sheet edge gripping rollers which function to maintain the proper width of the sheet as described more in detail in the Colburn patent referred to hereinabove. A heating chamber 16 beneath draw-pot 6 prevents excessive cooling of the lower strata of the glass in molten pool 8.

According to the present invention an additional cooler or heat-absorbing body 17 is positioned closely adjacent the surface of molten glass 10 just before it passes under jack-arch 11 into the draw-pot 6. In the form here shown, this cooler comprises a comparatively large hollow tubular metallic casing 18, supported at its ends by pipes 19 and 20. A cooling fluid such as water continuously flows in through pipe 19 at one end of the casing and out through pipe 20 at the other end. As here shown pipe 20 loops back above the casing 18 as shown at 21, whereby the inlet and outlet water connections are both positioned at the same side of the tank. Obviously, the upper return pipe 21 could be omitted and the water allowed to flow out at the opposite side of the tank.

The cooler 17 serves to block to a large extent one end of the passage 22 beneath jack-arch 11 and thus decrease the flow of heated gases from the furnace into the space above the molten pool 8 in draw-pot 6. At the same time cooler 17 will absorb heat from the upper strata of the molten glass 10 flowing thereunder, and assist the coolers 14 in reducing this glass to the proper working temperature. In this way sheet 7 may be withdrawn from pool 8 at a more rapid rate and the productive capacity of the machine is materially increased.

It is not essential that cooler 17 be located at the exact point here disclosed. It might be positioned at the other side of jack-arch 11, or beneath the jack-arch, or at any convenient point over the inflowing glass between the tank and draw-pot 6.

Claims:

1. In the method of drawing sheet glass, wherein molten glass is continuously flowed from a tank furnace into a shallow receptacle, and drawn away therefrom in sheet form, the process of removing heat from the glass as it flows into the receptacle by placing a heat-absorbing body closely adjacent the surface of this glass.

2. In the method of drawing sheet glass, wherein molten glass is continuously flowed from a tank furnace into a shallow receptacle, and drawn away therefrom in sheet form, the process of removing heat from the surface glass flowing into the receptacle by placing a heat-absorbing body closely adjacent the surface of this glass, prior to its entrance to the receptacle.

3. In sheet glass drawing mechanism, a receptacle containing a pool of molten glass, a tank furnace in open communication with the receptacle at one side thereof, means for drawing a glass sheet from the surface of the pool, means at either side of the sheet source for cooling the surface glass, and an additional cooling means above the surface of the glass flowing into the receptacle from the furnace, the latter cooling means comprising a hollow metallic casing through which a circulation of cooling fluid is maintained.

4. In the method of drawing sheet glass wherein molten glass is continuously flowed from a tank furnace into a shallow receptacle, and drawn therefrom in sheet form, the process of removing heat from the glass at the point substantially where it enters the receptacle by placing a heat absorbing body closely adjacent the surface of this glass.

Signed at Charleston, in the county of Kanawha and State of West Virginia, this 5th day of May, 1924.

JAS. B. SMALL.
FRANK J. KINCAID.